US010732258B1

(12) United States Patent
Sundaram et al.

(10) Patent No.: US 10,732,258 B1
(45) Date of Patent: Aug. 4, 2020

(54) HYBRID AUDIO-BASED PRESENCE DETECTION

(71) Applicant: Amazon Technologies, Inc., Seattle, WA (US)

(72) Inventors: Shiva Kumar Sundaram, Mountain View, CA (US); Rui Wang, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/276,278

(22) Filed: Sep. 26, 2016

(51) Int. Cl.
| | |
|---|---|
| *G10L 15/22* | (2006.01) |
| *H03G 3/00* | (2006.01) |
| *G01S 5/18* | (2006.01) |
| *G06N 3/08* | (2006.01) |
| *G06N 7/00* | (2006.01) |
| *G10L 25/87* | (2013.01) |
| *G10L 25/30* | (2013.01) |
| *G10L 25/84* | (2013.01) |

(52) U.S. Cl.
CPC .............. *G01S 5/18* (2013.01); *G06N 3/08* (2013.01); *G06N 7/005* (2013.01); *G10L 25/30* (2013.01); *G10L 25/84* (2013.01); *G10L 25/87* (2013.01)

(58) Field of Classification Search
CPC ......... G10L 15/16; G10L 15/20; G10L 15/00; G10L 25/78; G10L 13/00
USPC .......................................... 704/206, 231, 233
See application file for complete search history.

(56) References Cited

U.S. PATENT DOCUMENTS

| | | | | |
|---|---|---|---|---|
| 7,412,376 B2* | 8/2008 | Florencio | ................ | G10L 25/87 370/470 |
| 9,153,231 B1* | 10/2015 | Salvador | ............... | G10L 15/065 |
| 9,437,186 B1* | 9/2016 | Liu | ......... | G10L 15/05 |
| 9,620,105 B2* | 4/2017 | Mason | .................... | G10L 15/02 |
| 9,626,841 B2* | 4/2017 | Fadell | .................. | G08B 27/003 |
| 9,741,344 B2* | 8/2017 | Bakish | .................... | G10L 15/30 |
| 9,965,685 B2* | 5/2018 | Matsuoka | ................ | H04R 3/00 |
| 2008/0172225 A1* | 7/2008 | Kim | ........................ | G10L 25/87 704/233 |
| 2015/0170640 A1* | 6/2015 | Sak | ......................... | G10L 15/02 704/232 |
| 2015/0301796 A1* | 10/2015 | Visser | ..................... | G10L 17/08 715/728 |
| 2015/0341005 A1* | 11/2015 | Talwar | ..................... | H03G 3/00 704/231 |
| 2015/0380013 A1* | 12/2015 | Nongpiur | ................ | G10L 17/02 704/231 |
| 2016/0064008 A1* | 3/2016 | Graham | ............. | G10L 21/0208 704/227 |

(Continued)

*Primary Examiner* — Seong-Ah A Shin
(74) *Attorney, Agent, or Firm* — Pierce Atwood LLP

(57) ABSTRACT

A system capable of detecting human presence based on output from a model-free detector and model-based detector(s). For example, the model-free detector may identify acoustic events and the model-based detectors can determine specific types of acoustic events and whether the acoustic events are associated with human activity. Using output from the model-based detectors, a device may confirm that an acoustic event identified by the model-free detector is associated with human activity or may determine that the acoustic event is associated with non-human activity and can be ignored. Thus, the device may detect human presence based on a wide variety of noises while reducing a number of false positives associated with the model-free detector.

21 Claims, 12 Drawing Sheets

(56) References Cited

U.S. PATENT DOCUMENTS

| | | | |
|---|---|---|---|
| 2016/0240194 A1* | 8/2016 | Lee | G06F 1/3206 |
| 2016/0316293 A1* | 10/2016 | Klimanis | H04L 12/2823 |
| 2016/0335488 A1* | 11/2016 | Nongpiur | G10L 25/18 |
| 2016/0379632 A1* | 12/2016 | Hoffmeister | G10L 15/18 |
| | | | 704/253 |
| 2017/0133041 A1* | 5/2017 | Mortensen | G10L 25/15 |
| 2017/0236512 A1* | 8/2017 | Williams | G10L 15/22 |
| | | | 381/79 |
| 2017/0270919 A1* | 9/2017 | Parthasarathi | G10L 15/02 |

* cited by examiner

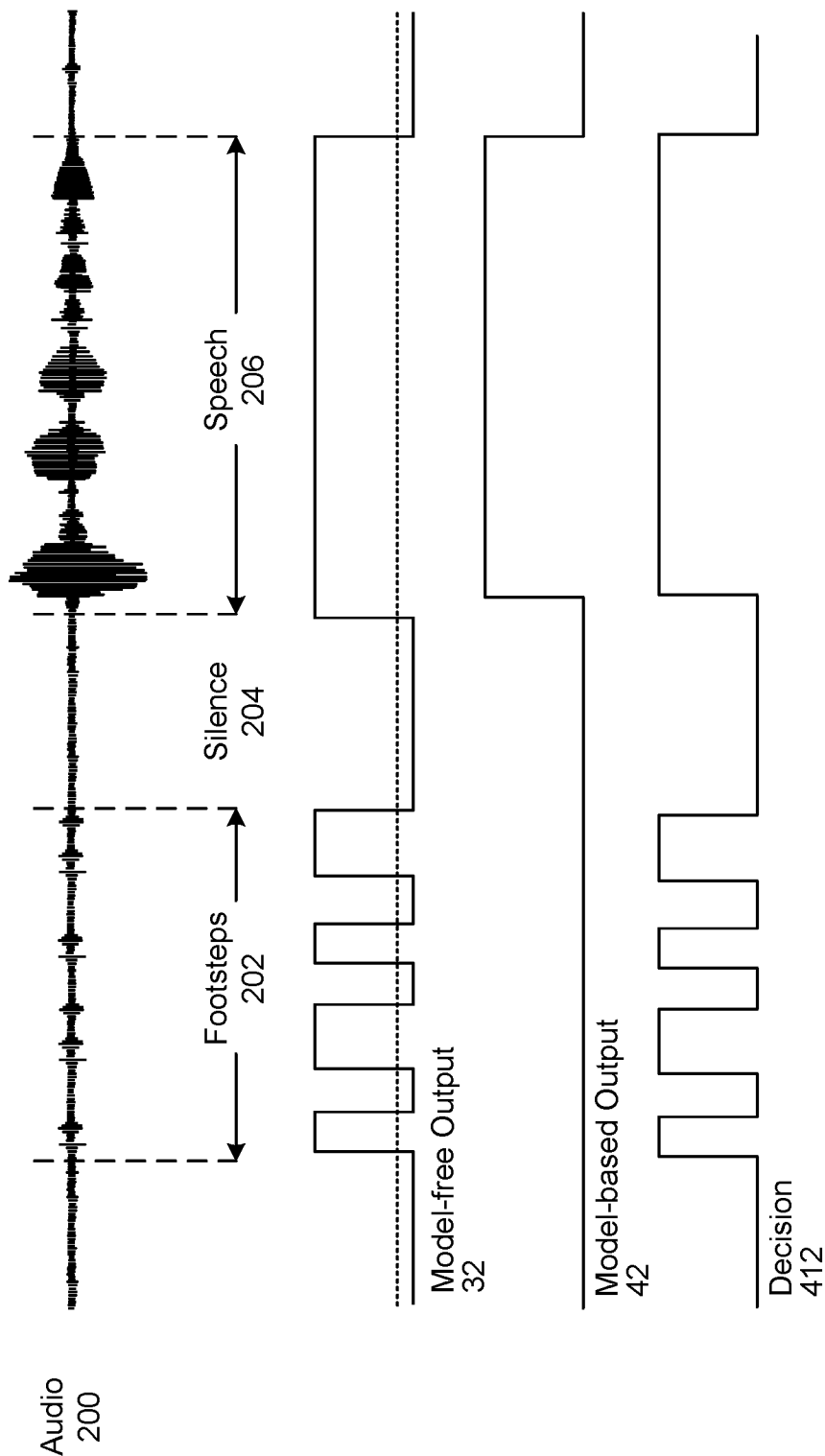

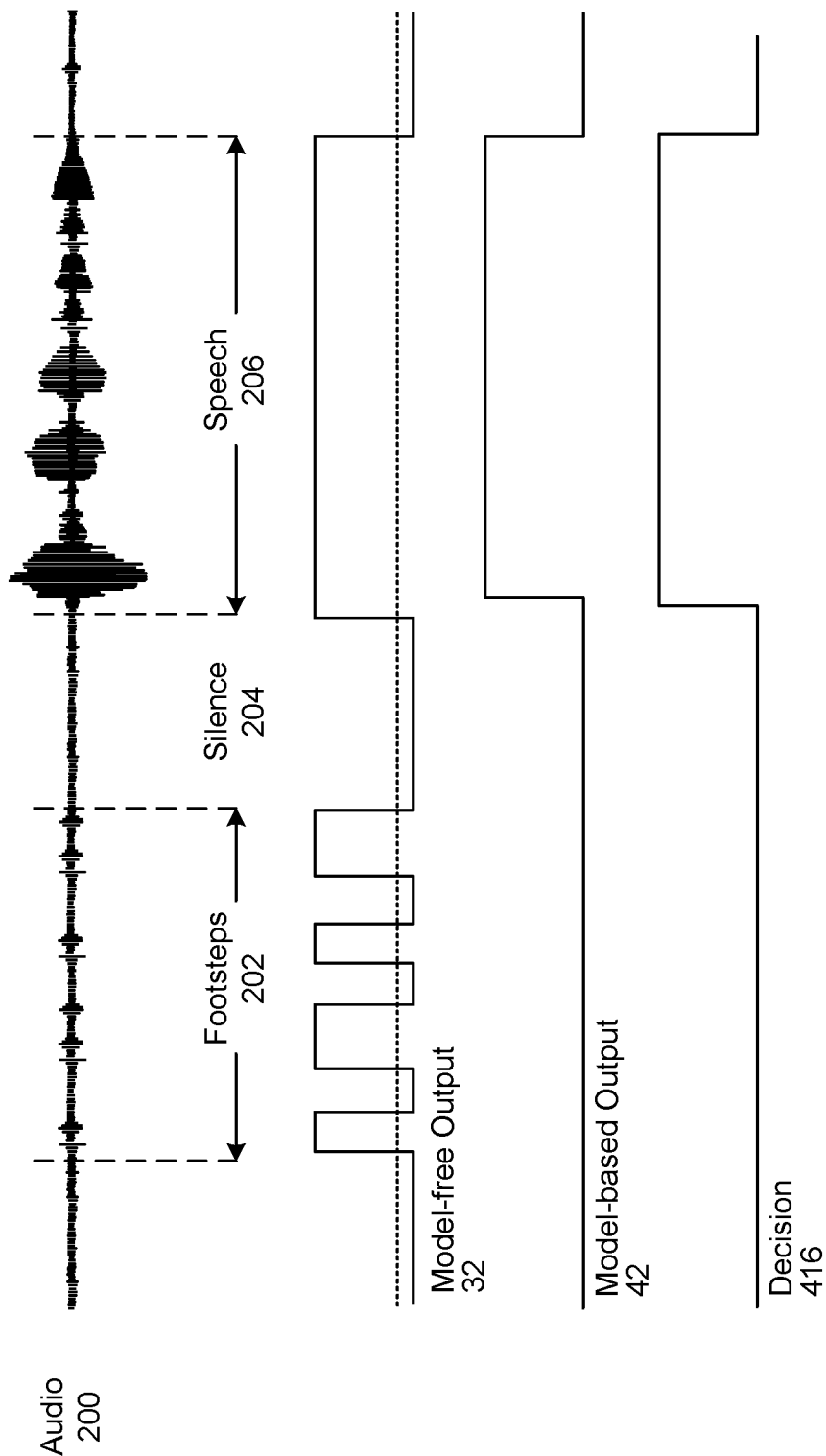

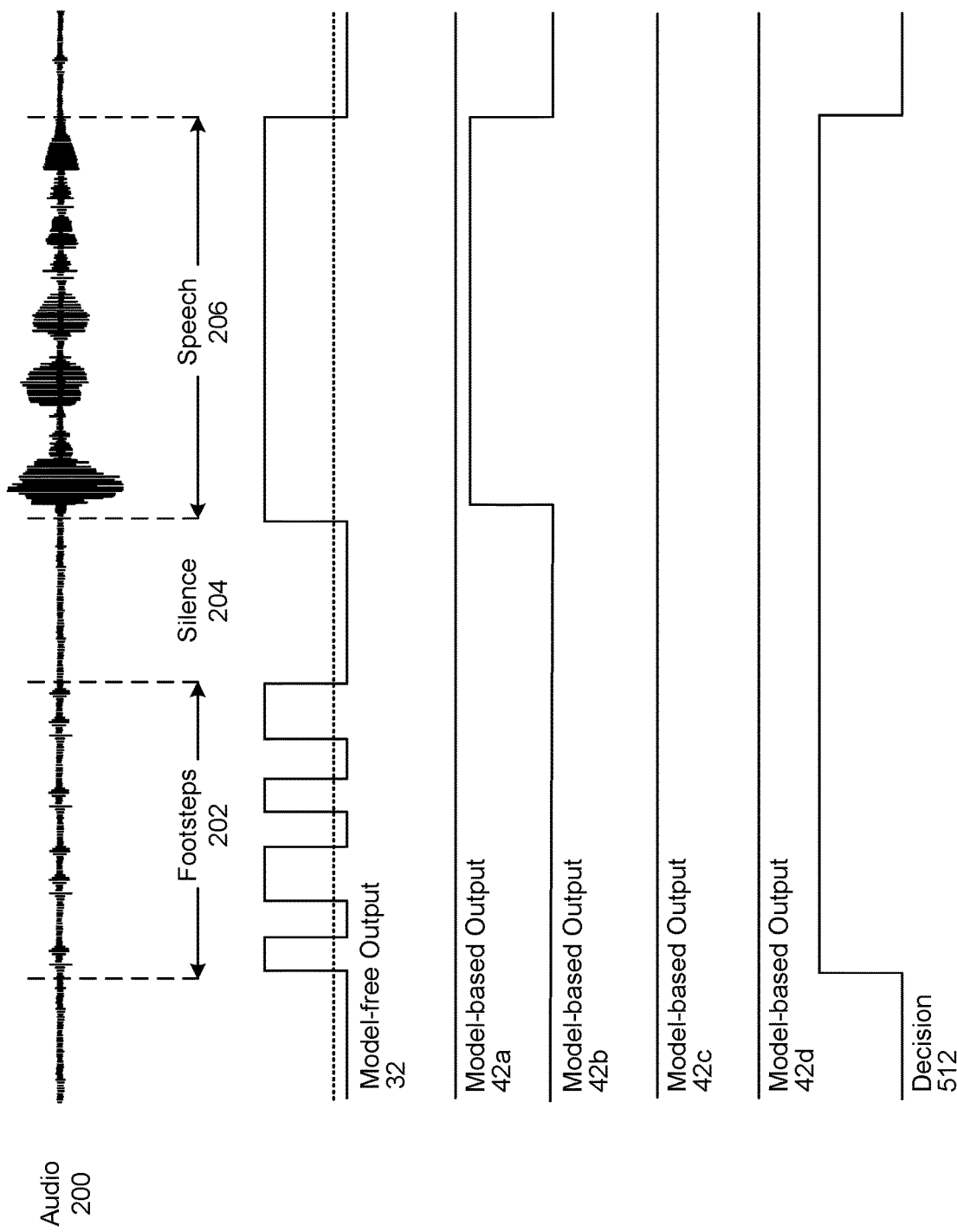

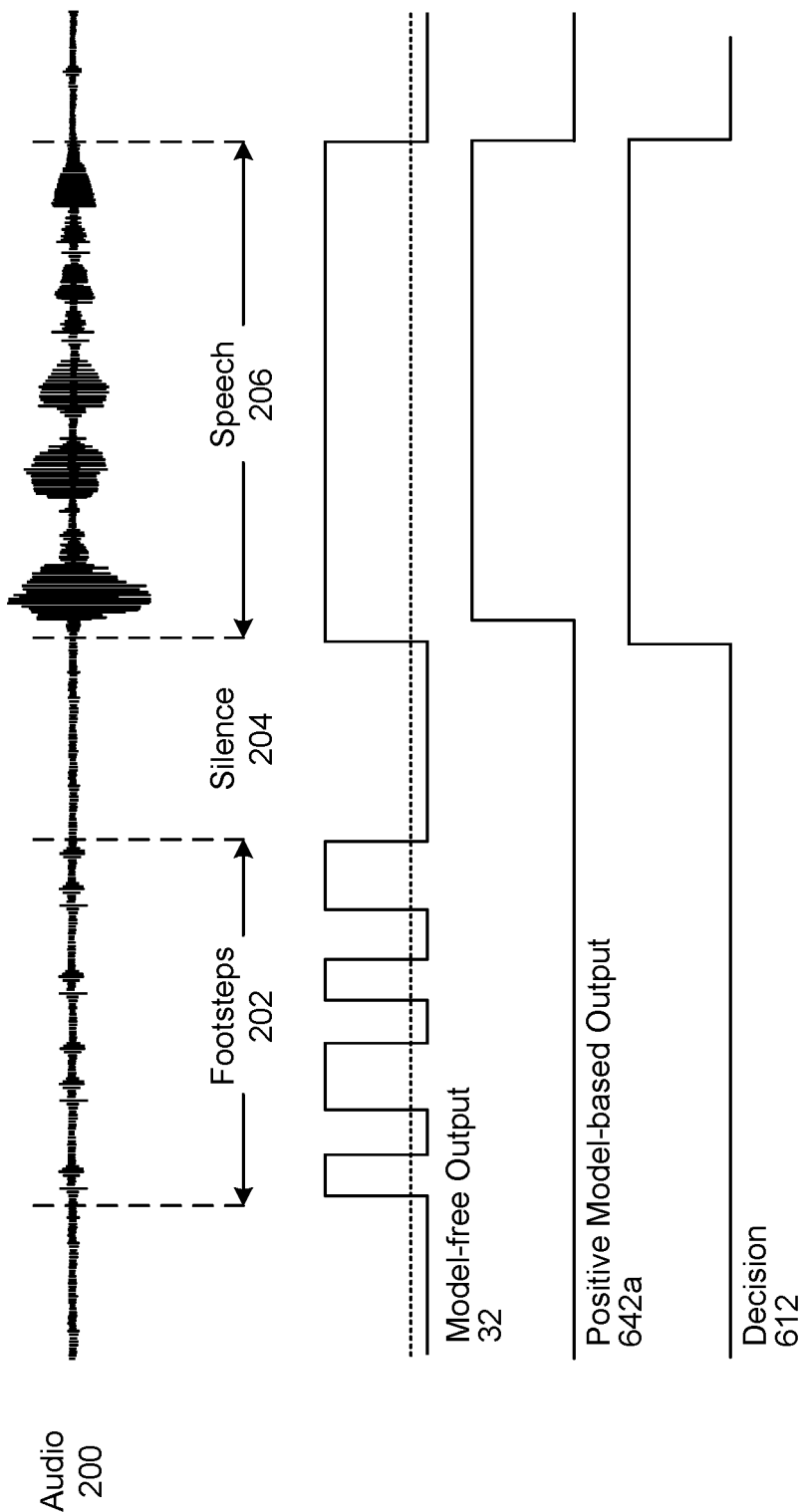

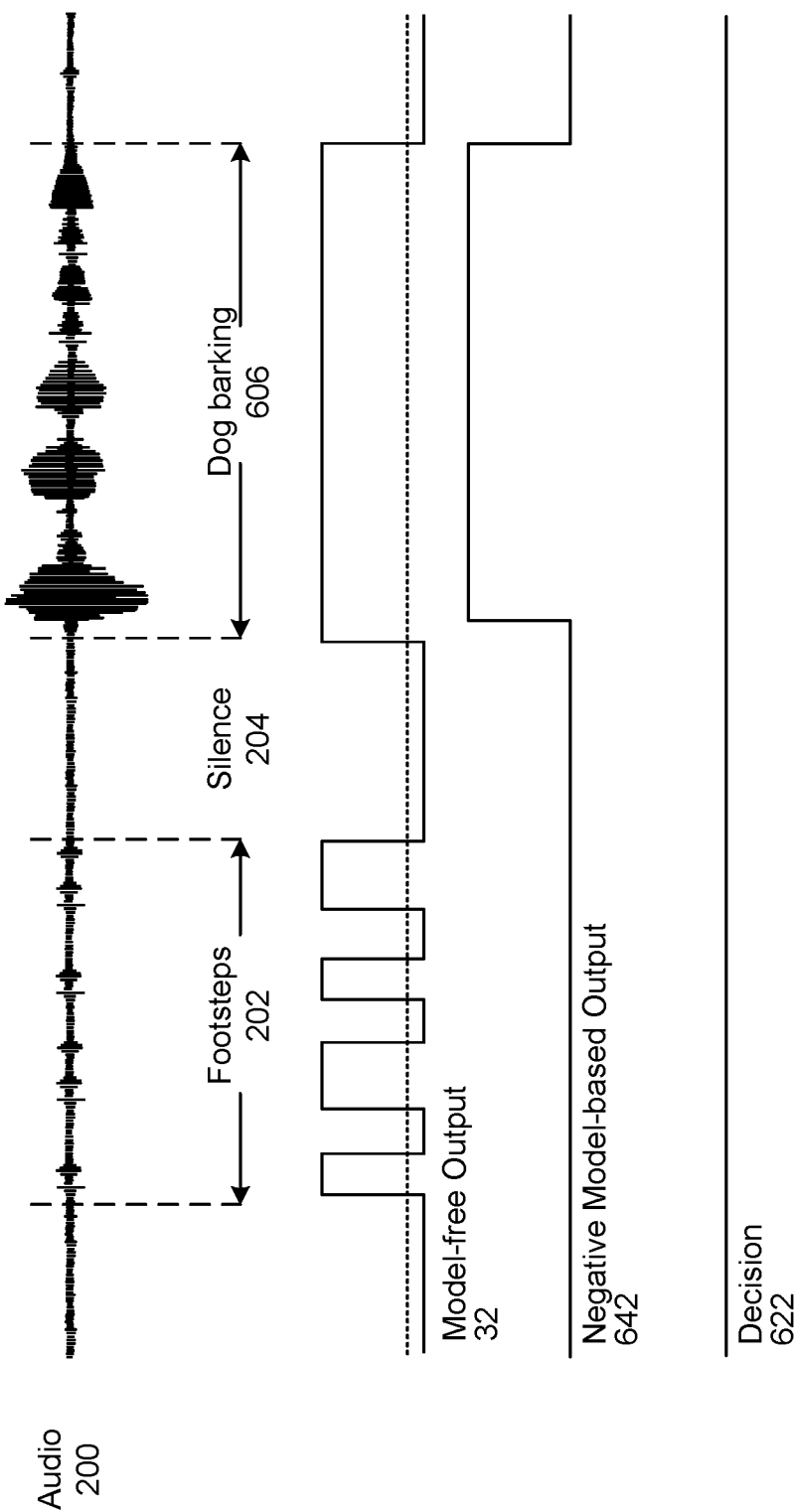

HYBRID AUDIO-BASED PRESENCE DETECTION

BACKGROUND

With the advancement of technology, the use and popularity of electronic devices has increased considerably. Electronic devices may provide first functionality when human presence is detected and second functionality when human presence is not detected. Disclosed herein are technical solutions to improve human presence detection.

BRIEF DESCRIPTION OF DRAWINGS

For a more complete understanding of the present disclosure, reference is now made to the following description taken in conjunction with the accompanying drawings.

FIGS. 4A-4C illustrate examples of output from a hybrid detector according to examples of the present disclosure.

FIG. 5 illustrates an example of output from a hybrid detector including multiple model-based detectors according to examples of the present disclosure.

FIGS. 6A-6B illustrate examples of positive indicators and negative indicators according to examples of the present disclosure.

DETAILED DESCRIPTION

Electronic devices may provide first functionality when human presence is detected and second functionality when human presence is not detected. For example, when human presence is not detected, a device may enter a low power mode in order to conserve power, such as dimming a display, turning off a camera or the like. When human presence is detected, various operations may be performed. For example, the device may enter an active mode in order to provide a low latency response to user queries or inputs. In addition, the device may share information about whether human presence is detected with other devices in order to improve communication with other users.

Electronic devices may use audio-based presence detection to determine when human presence is detected. Audio-based presence detection involves detecting time points of when certain acoustic events occurred. For example, events such as doors opening, start of music playback, or voice activity are indicators of a human user's presence. Certain acoustic events such as dog barking or cats meowing may not be reliable indicators of human presence. Acoustic events such as dishwasher sounds or vacuum cleaner sounds or the like may indicate that the user is busy.

Typically, audio-based presence detection is performed by model-based detectors, such as Deep Neural Network (DNN)-based acoustic event detectors configured to detect certain types of acoustic events, or model-free detectors, such as audio change detectors that identify changes in a signal level. The model-based detectors are capable of reliably detecting a variety of acoustic events, but are only able to detect acoustic events for which the detector has been trained. Thus, acoustic events for which the detector has not been trained are undetected, requiring a number of detectors or a large amount of training data. In contrast, the model-free detector is capable of detecting changes in the signal level, but is unable to differentiate between different types of acoustic events. Thus, acoustic events related to human activity are detected along with acoustic events unrelated to human activity.

To improve human presence detection, devices, systems and methods are disclosed that combine a model-free detector with one or more model-based detectors. For example, the model-free detector may identify acoustic events and the model-based detectors can determine specific types of acoustic events and whether the acoustic events are associated with human activity. Using output from the model-based detectors, a device may confirm that an acoustic event identified by the model-free detector is associated with human activity or may determine that the acoustic event is associated with non-human activity and can be ignored. Thus, the device may detect human presence based on a wide variety of noises while reducing a number of false positives associated with the model-free detector.

Figure 1:
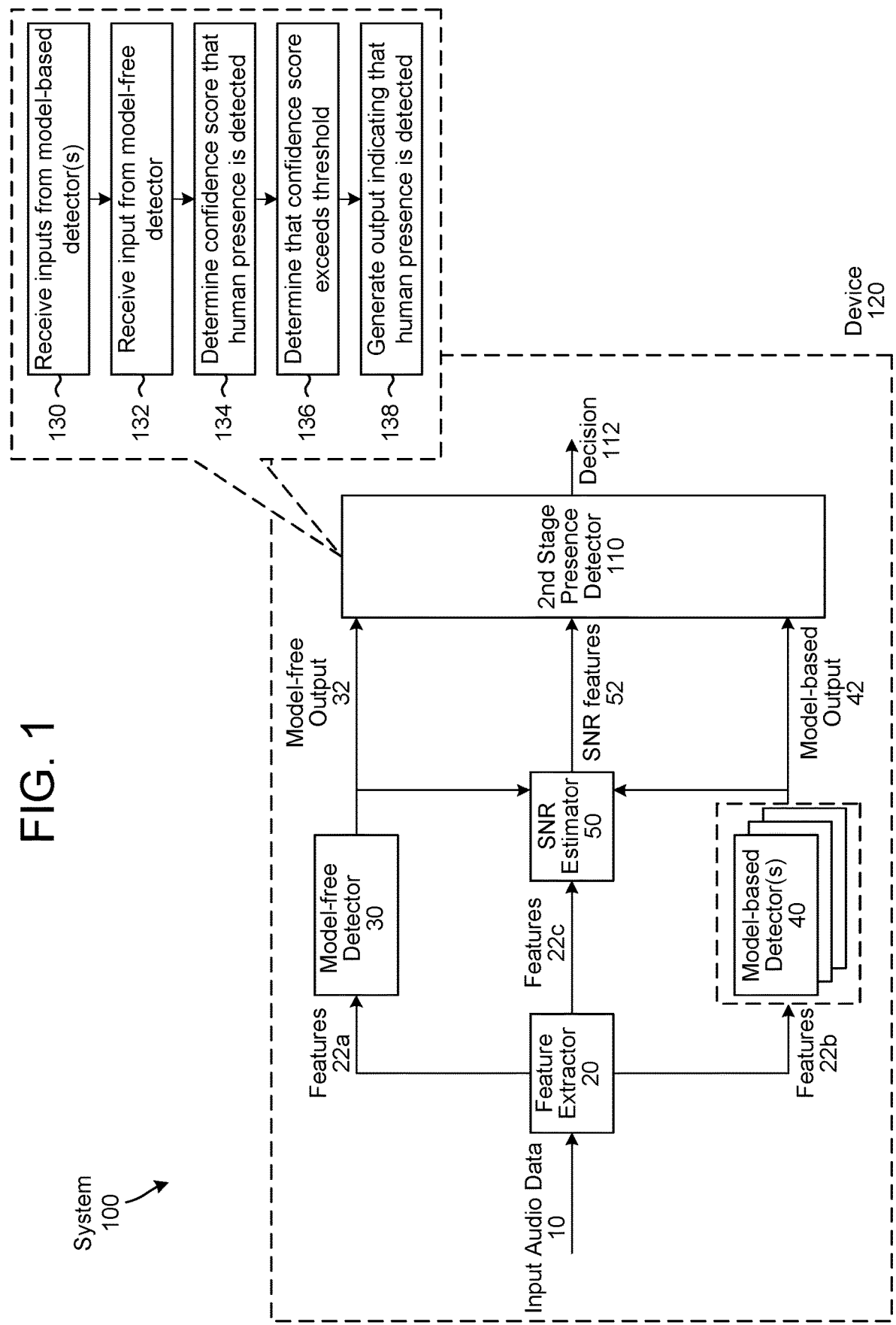
FIG. 1 illustrates a system according to embodiments of the present disclosure.

FIG. 1 illustrates a high-level conceptual block diagram of a system 100 configured to detect human presence using audio data. Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include a feature extractor 20, a model-free detector 30, model-based detector(s) 40, an SNR estimator 50 and a second stage presence detector 110. A device 120 may include the feature extractor 20, the model-free detector 30, the model-based detector(s) 40, the SNR estimator 50 and/or the second stage presence detector 110, although the disclosure is not limited thereto and some of the components may be included separate devices 120 and/or in remote server(s) without departing from the disclosure.

The system 100 may use audio-based presence detection to determine the presence of users in the vicinity of the device 120 (e.g., detect human activity). When the system 100 determines that users are present in the vicinity of the device 120, the device 120 may perform actions (e.g., generate images on a display, generate output audio using a speaker, etc.), the system 100 may determine information about the user's availability (e.g., home, available, away, offline, busy, etc.), and/or the system 100 may send the information about the user's availability to a remote device (e.g., remote server(s) associated with the user, a remote device associated with a different user, etc.). For example, depending on user preferences and/or permission settings associated with the device 120, the information about the user's availability may be sent to a second device associated with family of the user and may enable the second device to initiate a voice and/or video conversation with the device 120.

Audio-based presence detection may involve detecting time points corresponding to when certain acoustic events occurred. For example, events such as doors opening, start of music playback, and/or voice activity are indicators of a human user's presence. In contrast, events such as dog barking, cat meowing or other pet sounds, street or car noises outside of a residence, home appliances (e.g., washing machine, dryer, dishwasher, air conditioner, furnace, plumbing, refrigerator, etc.) or other mechanical noises inside of the residence, fire alarms or other noises may not be reliable indicators of human presence. Some events may be indicators of human presence but may also indicate that the human is busy. For example, events such as vacuum cleaner sounds, infants crying, sounds associated with washing dishes or the like may indicate that the user is busy and therefore unavailable.

The system 100 may identify acoustic events and determine whether human presence is detected and/or whether the user is unavailable. For example, the system 100 may capture audio using a microphone (not illustrated) in proximity to the device 120 and may generate input audio data 10. The microphone may be included in the device 120, but the disclosure is not limited thereto and the microphone may instead be separate from the device 120.

The feature extractor 20 may receive the input audio data 10 and may generate feature vectors (e.g., features 22). For example, the feature extraction process may convert 10-20 millisecond frames of audio data to a feature vector that can be processed by the model-free detector 30 and/or the model-based detector(s) 40 to detect human activity associated with the feature vector (e.g., 10-20 millisecond frames of audio data). Thus, the input audio data 10 may be processed into the features 22 to enable the model-free detector 30 and/or the model-based detector(s) 40 to identify portions of the input audio data 10 that correspond to human activity.

As illustrated in FIG. 1, the feature extractor 20 may generate first features 22a for the model-free detector 30, second features 22b for the model-based detector(s) 40 and third features 22c for the SNR estimator 50. However, while FIG. 1 illustrates the first features 22a, the second features 22b and the third features 22c as separate and distinct, the disclosure is not limited thereto and some and/or all of the features included in the first features 22a may be included in the second features 22b and/or the third features 22c, and vice versa, without departing from the disclosure. For example, the feature extractor 20 may generate a first portion of features that are sent to three components (e.g., included in features 22a/22b/22c), a second portion of features that are sent to only two components (e.g., included in two of features 22a/22b/22c), and a third portion of features that are sent to only one component (e.g., included only in first features 22a, second features 22b or third features 22c). Thus, some of the features used in the model-free detector 30 may be different from features used in the model-based detectors 40, while other features may be used in both the model-free detector 30 and the model-based detector(s) 40. Similarly, while FIG. 1 illustrates the second features 22b being sent to the model-based detector(s) 40, each of the model-based detector(s) 40 may receive only a portion of the second features 22b without departing from the disclosure.

The feature extractor 20 may determine many different features, as known in the art, and each feature may represent some quality of the audio that may be useful for further processing. For example, the feature extractor 20 may identify features associated with energy within the signal and/or energy within certain frequencies, but the disclosure is not limited thereto. Instead, the feature extractor 20 may determine frequency centroid(s) (e.g., mean of different energies) associated with signal(s) and/or noise. For example, the feature extractor 20 may determine a first frequency centroid associated with the noise and a second frequency centroid associated with a signal. A number of approaches may be used by the feature extractor to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

Typically, audio-based presence detection is performed using one or more of the model-based detector(s) 40. Each of the model-based detector(s) 40 may be configured to detect particular noises and human presence is determined based on the outputs of the model-based detector(s) 40. For example, a first model-based detector may be associated with speech, a second model-based detector may be associated with music, a third model-based detector may be associated with pet sounds, etc. Thus, the model-based detector(s) 40 may identify a variety of acoustic events, such as speech, music, pet sounds, street or car noises outside of the residence, home appliances (e.g., washing machine, dryer, dishwasher, air conditioner, furnace, plumbing, refrigerator, etc.) or other mechanical noises inside of the residence, fire alarms or the like.

Figure 2:
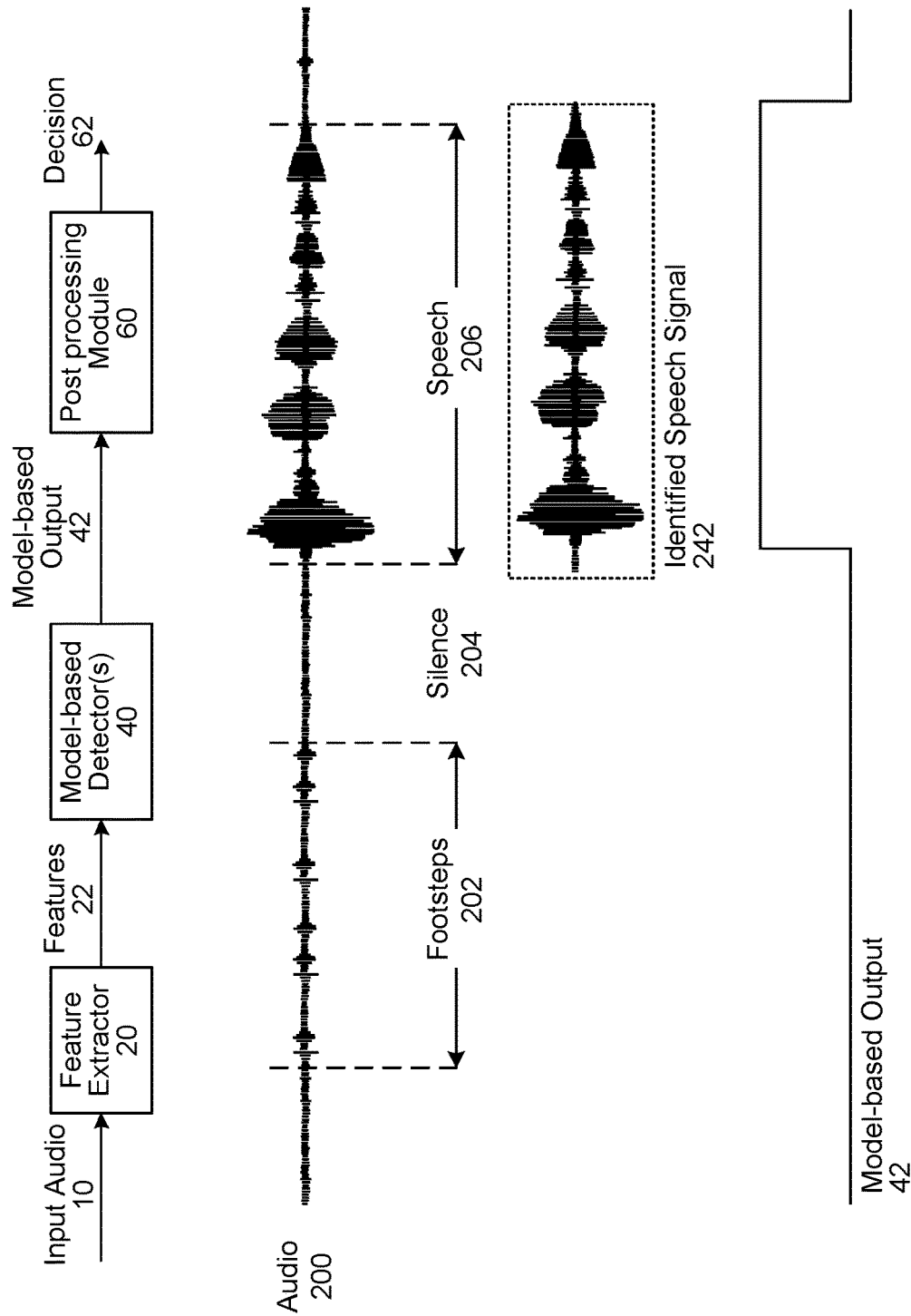
FIG. 2 illustrates an example of audio-based presence detection using a model-based detector.

FIG. 2 illustrates an example of audio-based presence detection using a model-based detector. The feature extractor 20 may receive input audio 10 and generate features 22, as discussed above, and the model-based detector(s) 40 may receive the features 22 and generate model-based output 42 indicating whether portions of the features 22 correspond to specific acoustic events of interest. For example, the model-based detector(s) 40 may be configured to identify speech and logic high levels in the model-based output 42 may correspond to portions of the audio where speech is identified. Thus, the model-based detector(s) 40 may output a detection score for events of interest on a frame-by-frame basis.

FIG. 2 illustrates an example of the model-based detector(s) 40 identifying speech and generating model-based output 42. As illustrated in FIG. 2, a first portion of audio 200 may correspond to footsteps 202, a second portion of the audio 200 may correspond to silence 204, and a third portion of the audio 200 may correspond to speech 206. The model-based detector(s) 40 may identify the speech 206 as an identified speech signal 242 and may generate the model-based output 42 with a logic high corresponding to the identified speech signal 242 and a logic low corresponding to the remaining portions of the audio 200.

While FIG. 2 illustrates the model-based output 42 corresponding to the audio 200 over a period of time, this is intended for ease of explanation and the disclosure is not limited thereto. Instead, the model-based detector(s) 42 may generate the model-based output 42 on a frame-by-frame basis, with each frame corresponding to a fixed duration of time. The post processing module 60 may receive the model-based output 42 and determine if human presence is detected based on the detection scores. The post processing module 60 may build longer-term dependencies for determining the detection result, which may be a binary true (e.g., logic high level) or false (e.g., logic low level).

The model-based detector(s) 40 may use statistical model-based classifiers to detect the events of interest. For example, the model-based detector(s) 40 may use Deep Neural Networks (DNN) to detect the acoustic events. Thus, the model-based detector(s) 40 may be trained using labelled training data to learn model weights that are configured to specific audio events of interest. Model-based detection is made possible by implicitly training a foreground model (e.g., voice detection) and a background model. The post processing module 60 may receive the detect/not-detected output of the model-based detector(s) 40 (e.g., DNN) and determine the likelihood of human presence for each event (e.g., period of time, frames of the input audio data 10, etc.). This likelihood calculation may be performed using a hidden markov model (HMM) with appropriate transition probabilities.

While the model-based detector(s) 40 are capable of reliably detecting a variety of acoustic events, the model-based detector(s) 40 are only able to detect acoustic events associated with the labelled training data. For example, the model-based detector(s) 40 are incapable of detecting acoustic events for which the model-based detector(s) 40 have not received sufficient labelled training data. Therefore, the model-based detector(s) 40 are inflexible and limited in the types of acoustic events that can be detected based on the labelled training data available. While the model-based detector(s) 40 could be trained using additional labelled training data for individual acoustic events of interest, there are drawbacks associated with this approach. For example, capturing sufficient labelled training data for large number of events can be expensive, and frequency and temporal signatures of acoustic events can be highly confusing. Therefore, the model-based detector(s) 40 may perform poorly for certain events (e.g., footsteps) even if large amounts of labelled training data is available.

In contrast to the model-based detector(s) 40, the model-free detector 30 is very flexible and can detect changes in audio signals without any previous training data. Instead of identifying certain types of acoustic events, the model-free detector 30 uses noise floor tracking and detects changes in the signal level. The model-free detector 30 detects when a signal level (e.g., instantaneous energy level) associated with an individual feature 22 differs from a reference signal level (e.g., background energy level) by more than a threshold. Thus, the model-free detector 30 is able to detect when changes in the input audio data 10 occur but is unable to differentiate between different types of acoustic events. For example, the model-free detector 30 may detect footsteps, opening/closing doors, speech activity and other miscellaneous events such as keyboard clicks, operation of kitchen appliances, faucets etc. that result in changes to the noise floor that are indicative of the user's presence. However, the model-free detector 30 will also detect pet sounds, street or car noises outside of a residence, home appliances (e.g., washing machine, dryer, dishwasher, air conditioner, furnace, plumbing, refrigerator, etc.) or other mechanical noises inside of the residence, fire alarms or other noises that are not indicative of the user's presence.

Figure 3:
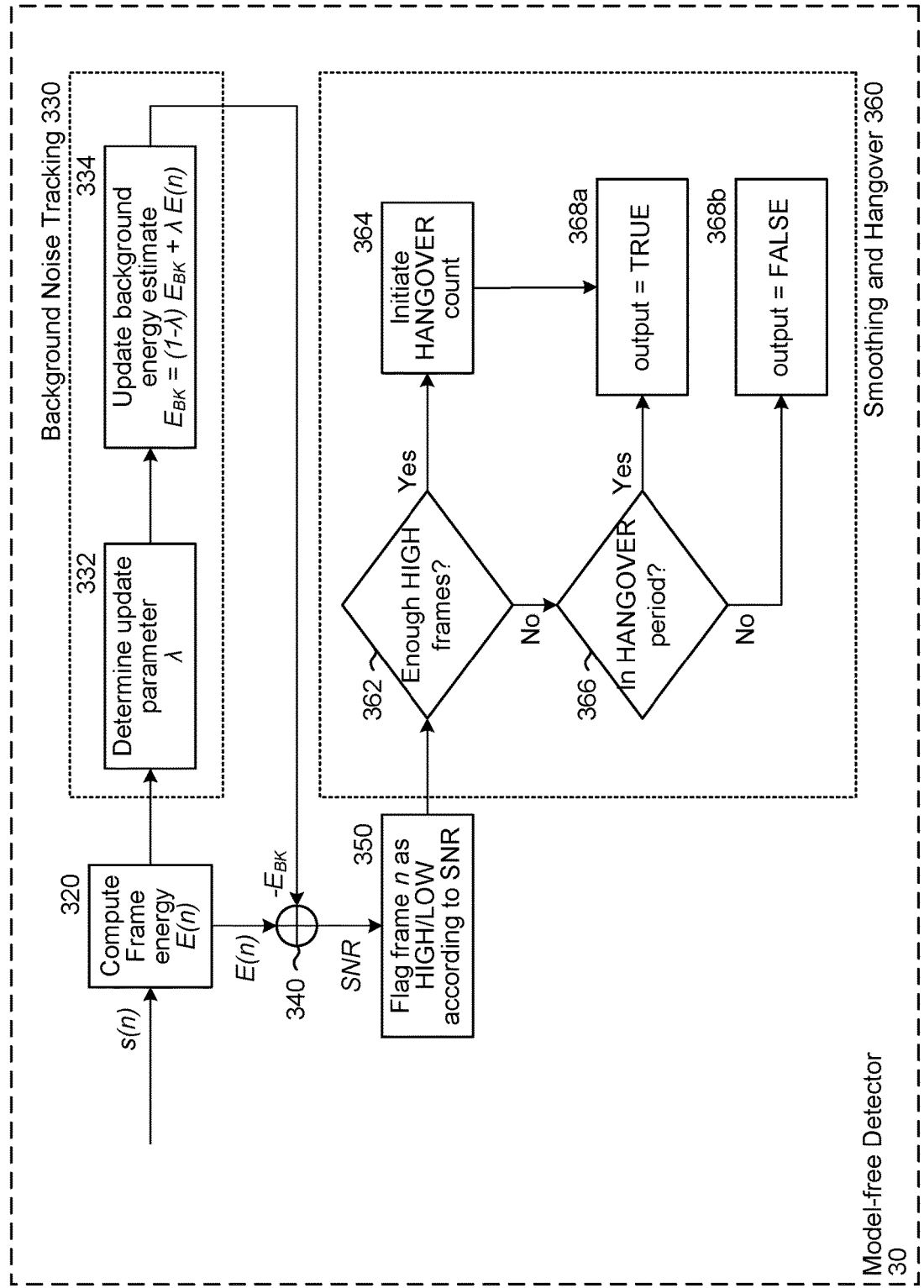
FIG. 3 illustrates an example of audio-based presence detection using a model-free detector.

FIG. 3 illustrates an example of audio-based presence detection using a model-free detector. As illustrated in FIG. 3, the model-free detector 30 may receive a signal s(n) and may compute (320) frame energy E(n) for an individual frame. The model-free detector 30 may perform background noise tracking 330, which may determine (332) an update parameter $\lambda$ and may update (334) a background energy estimate $E_{BK}$ using the equation $E_{BK}=(1-\lambda)E_{BK}+\lambda E(n)$. The model-free detector 30 may sum the frame energy E(n) and the background energy estimate $E_{BK}$ to determine a signal-to-noise ratio (SNR) value.

The model-free detector 30 may operate using different time scales, depending on the value of the update parameter $\lambda$. For example, changing the value of the update parameter $\lambda$ may result in the model-free detector 30 changing a time scale associated with the background energy estimate from a time scale of 5 minutes, to 10 minutes, to more than an hour. In some examples, the model-free detector 30 may determine the background energy estimate for multiple time scales simultaneously, such as a first background energy estimate for a five minute time scale and a second background energy estimate for an hour time scale. Additionally or alternatively, the model-free detector 30 may have different sensitivities associated with different time scales, such as higher or lower thresholds depending on the time scale. Thus, the different time scales may result in multiple outputs, with each output having a different start and end point depending on the threshold associated with the time scale.

The model-free detector 30 may flag (350) the frame n as HIGH (e.g., logic high level, or 1) or LOW (e.g., logic low level, or 0) according to the SNR value. For example, the model-free detector 30 may determine that the SNR value is above a threshold and flag the frame n as HIGH or may determine that the SNR value is below the threshold and flag the frame n as LOW.

The model-free detector 30 may perform smoothing and hangover 360, which may determine (362) if there are enough high frames in a row. If there are enough high frames, the model-free detector 30 may initiate (364) a hangover count and set (368a) the output (e.g., model-free output 32) to true (e.g., logic high level, or 1). If there aren't enough high frames, the model-free detector 30 may determine (366) if the frame is in a hangover period and, if so, may set (368a) the output to true. If the frame is not in the hangover period, the model-free detector 30 may set (368b) the output to false (e.g., logic low level, or 0). For example, the hangover count may correspond to a duration of time (e.g., 20-50 ms) to perform hysteresis and prevent the output from bouncing between true and false.

Thus, the model-free detector 30 may require a fixed number of high frames before setting the output to true (e.g., logic high level, or 1) and will continue to set the output to true, despite intermittent low frames, until there are low frames for the duration of time associated with the hangover count. The fixed number of high frames may be static (e.g., determined once and unchanged over time) or dynamic (e.g., determined periodically). Additionally or alternatively, the fixed number of high frames may vary based on the time scale associated with the update parameter $\lambda$. For example, a first time scale (e.g., one minute) may correspond to a first number of high frames whereas a second time scale (e.g., one hour) may correspond to a second number of high frames that is larger than the first number. In some examples, the model-free detector 30 may generate multiple outputs using different values for the fixed number of high frames. For example, the model-free detector 30 may generate a first output using the first number of high frames (over the first time scale) and may generate a second output using the second number of high frames (over the first time scale). Thus, the model-free detector 30 may include more granular data with which the second stage presence detector 110 may determine whether human activity is detected.

The model-free detector 30 has the benefit of a small footprint and trivial memory consumption, low compute power (e.g., 5-10 million instructions per second (MIPS)) and low latency (e.g., 10-20 ms). However, the model-free detector 30 suffers from high false positives (e.g., above 20% of frames for voice detection), requires additional feature engineering work (e.g., noise reduction) for certain noise conditions and risks, may be difficult to design for non-speech acoustic events, and is rule-based and largely empirical, so performance improvement is not likely over a lifetime of the device 120.

In contrast, the model-based detector(s) 40 have the benefit of generating low false positives (e.g., below 10% of frames for voice detection), need minimal feature engineering, have low to medium latency (e.g., 20-50 ms, depending no event of interest), may allow fine-grained, scalable control of features and performance improvement is viable over a lifetime of the device 120. However, the model-based detector(s) 40 suffer from medium to large memory requirements (e.g., 500 kB to 2 MB) relative to the model-free detector 30, medium to high computing power (e.g., 10-50 MIPS), and requires additional data collection and labelled training data in order to scale beyond speech detection.

To improve human presence detection, the device 120 includes the model-free detector 30 and the model-based detector(s) 40. Thus, device 120 uses a hybrid approach where the model-free detector 30 is combined with one or more model-based detector(s) 40 in order to combine the benefits of both approaches. For example, the device 120 may combine a DNN-based event detector with a simpler, model-free change-point detector. The model-based detector(s) 40 may be trained to detect events for which large amounts of training data is available (e.g., speech). For such events, models can be trained to give high precision/recall performance. Concurrently, the model-free detector 30 will detect any energy changes in the audio data. The model-free detector 30 may combine long term noise floor changes with short term changes in the audio level and is content agnostic, triggering every time the short-term audio level changes significantly over the long-term noise floor.

In some examples, the device 120 may include a single model-based detector 40, as a DNN-based speech detector (e.g., model-based detector(s) 40) can be trained to give very high performance for speech detection and non-speech events can be handled using the model-free detector 30. Therefore, the model-free detector 30 may detect changes in the audio level that are not detected by the model-based detector(s) 40 but can be used to determine human presence. For example, model-based detector(s) 40 configured to detect voice activity may not detect sounds associated with shuffling papers, whereas the model-free change detector 30 may detect the paper shuffling sounds. Therefore, the device 120 may detect the paper shuffling sounds despite the model-based detectors 40 not being trained to detect the paper shuffling sounds.

The disclosure is not limited thereto, however, and in other examples the device 120 may include multiple model-based detectors 40 without departing from the disclosure. For example, model-based detectors 40 may be configured to specific types of acoustic events, such as a model-based detector for speech detection, a model-based detector for music, a model-based detector for noises associated with animals, a model-based detector for street noises outside of a residence, a model-based detector for noises associated with appliances within a residence, etc.

As additional model-based detectors 40 are included in the device 120, the outputs can be combined selectively to determine whether human presence is detected. For example, some of the model-based detectors 40 may act as a positive indicator (e.g., positive trigger) for human presence, such as model-based detectors 40 configured to detect speech. Thus, a logic high level from the model-based detectors 40 may be associated with human presence and confirm a logic high level from the model-free detector 30. For example, a logic high level from the model-free detector 30 may be associated with a first confidence score, indicating a first likelihood that the human presence is detected. However, a logic high level from the model-based detectors 40 associated with positive indicators may be associated with a second confidence score higher than the first confidence score, indicating a second likelihood that the acoustic event is associated with human activity and therefore that human presence is detected.

In some examples, some of the model-based detectors 40 may act as a negative indicator (e.g., negative trigger) for human presence, such as model-based detectors 40 configured to detect music, noises associated with animals, street noises and/or noises associated with appliances. Outputs from model-based detectors 40 associated with negative indicators may be used to reduce the false-positives for acoustic events that are not of interest. For example, if a dog is barking or a cat is meowing, the model-free detector 30 may generate a logic high level despite the noise not being associated with human presence (e.g., false positive). However, a logic high level from the model-based detectors 40 may be associated with non-human activity and may cause the device 120 to ignore the logic high level from the model-free detector 30. For example, the model-free detector 30 may detect that the short-term audio level changed significantly over the long-term noise floor when a dog barks, generating a logic high level, but the model-based detector 40 configured to detect noises associated with animals may generate a logic high level, indicating that the noise detected by the model-free detector 30 was the result of non-human activity. Therefore, the device 120 may determine that human presence is not detected, despite the model-free detector 30 generating the logic high level.

As illustrated in FIG. 1, the system 100 includes the feature extractor 20, which may receive the input audio data 10 and generate frequency-based feature vectors (e.g., features 22). For example, the feature extraction process may convert 10-20 millisecond frames of audio data to a frequency-based feature vector that can be processed by the model-free detector 30 and/or the model-based detector(s) 40 to detect human activity associated with the feature vector (e.g., 10-20 millisecond frames of audio data). Thus, the input audio data 10 may be processed into the features 22 to enable the model-free detector 30 and/or the model-based detector(s) 40 to identify portions of the input audio data 10 that correspond to human activity.

The system 100 may include the model-free detector 30, which may receive the features 22 and generate model-free output 32. The model-free output 32 may include binary data (e.g., logic low level and logic high level), confidence scores indicating a likelihood that human presence is detected and/or non-binary data (e.g., a range of values from 0 to 1) without departing from the disclosure. The model-free detector 30 detects when a signal level (e.g., instantaneous energy level, or frame energy E(n)) associated with an individual feature 22 differs from a reference signal level (e.g., background energy level, or background energy estimate $E_{BK}$) by more than a threshold. Thus, the model-free detector 30 may detect changes in the audio level that are not detected by the model-based detector(s) 40 but can be used to determine human presence. For example, model-based detector(s) 40 configured to detect voice activity may not detect sounds associated with shuffling papers, whereas the model-free change detector 30 may detect the paper shuffling sounds. Therefore, the device 120 may detect the paper shuffling sounds despite the model-based detectors 40 not being trained to detect the paper shuffling sounds.

While FIG. 1 illustrates a single model-free detector 30, the disclosure is not limited thereto. Instead, in some examples the system 100 may include multiple model-free detectors 30 to determine background energy estimates for multiple time scales simultaneously without departing from the disclosure. For example, a first model-free detector may determine a first background energy estimate using a five minute time scale and a second model-free detector may determine a second background energy estimate using an hour time scale. Additionally or alternatively, the system 100 may include multiple model-free detectors 30 corresponding to different frequency bands. For example, a first model-free detector 30 may analyze energy within a first frequency band while a second model-free detector 30 may analyze energy within a second frequency band without departing from the disclosure.

While the model-free detector 30 is able to detect when changes in the input audio data 10 occur, the model-free detector 30 is unable to differentiate between different types of acoustic events. For example, the model-free detector 30 may detect footsteps, opening/closing doors, speech activity and other miscellaneous events such as keyboard clicks, operation of kitchen appliances, faucets etc. that result in changes to the noise floor that are indicative of the user's presence. However, the model-free detector 30 will also detect pet sounds, street or car noises outside of a residence, home appliances (e.g., washing machine, dryer, dishwasher, air conditioner, furnace, plumbing, refrigerator, etc.) or other mechanical noises inside of the residence, fire alarms or other noises that are not indicative of the user's presence.

To improve the human presence detection of the system 100 and avoid false positives associated with the model-free detector 30, the system 100 may include one or more model-based detector(s) 40 configured to generate model-based output 42. The model-based output 42 may include binary data (e.g., logic low level and logic high level), confidence scores indicating a likelihood that human presence is detected and/or non-binary data (e.g., a range of values from 0 to 1) without departing from the disclosure.

The model-based detector(s) 40 may use Deep Neural Networks (DNN) that are trained to identify a variety of acoustic events, such as speech, music, pet sounds, street or car noises outside of the residence, home appliances (e.g., washing machine, dryer, dishwasher, air conditioner, furnace, plumbing, refrigerator, etc.) or other mechanical noises inside of the residence, fire alarms or the like. For example, a first model-based detector(s) 40 (e.g., DNN-based speech detector) can be trained to give very high performance for speech detection, while a second model-based detector(s) 40 (e.g., DNN-based music detector) can be trained to give very high performance for music detection, and so on. As discussed above, some of the model-based detector(s) 40 may be associated with positive indicators of human activity (e.g., a logic high level results in an increased confidence score and/or likelihood that human presence is detected), while some of the model-based detector(s) 40 may be associated with negative indicators of human activity (e.g., a logic high level results in a decreased confidence score and/or likelihood that human presence is detected).

The system 100 may include a signal-to-noise (SNR) estimator 50 configured to receive the features 22*c*, the model-free output 32 and/or the model-based output 42 and generate SNR features 52. The SNR estimator 50 may determine the SNR features 52 using the model-free output 32 and/or the model-based output 42. For example, the model-free output 32 and/or the model-based output 42 may be control signals (e.g., binary on and off) and the SNR estimator 50 may use the control signals to distinguish between signal and noise. Additionally or alternatively, the model-free output 32 and/or the model-based output 42 may be confidence scores and the SNR estimator 50 may compare the confidence scores to generate additional information for the second stage presence detector 110.

The SNR features 52 may correspond to multiple time scales and the SNR estimator 50 may output different SNR features 52 for the model-free detector 30, the model-based detector(s) 40 and/or each of the model-based detector(s) 40 individually. For example, the SNR estimator 50 may generate multiple SNR values, such as a first SNR value for a first time range (e.g., 6 seconds) for the model-free detector 30, a second SNR value for the first time range for the model-based detector(s) 40, a third SNR value for a second time range (e.g., 0.5 seconds) for the model-free detector 30, a fourth SNR value for the second time range for the model-based detector(s) 40, and so on. The time scales may vary from a relatively short period of time (e.g., 0.5 seconds) to a relatively long period of time (e.g., one minute, every few minutes, etc.) depending on the input audio data 10. For example, when the input audio data 10 varies frequently (e.g., the input audio data 10 includes frequent noises), the SNR estimator 50 may generate SNR values with smaller time scales, whereas when the input audio data 10 varies infrequently (e.g., the input audio data 10 captures silence for a long period of time), the SNR estimator 50 may generate SNR values with larger time scales.

In some examples, the SNR estimator 50 may generate SNR features 52 indicating a ratio between a signal and noise. For example, the SNR estimator 50 may determine a first energy value associated with the noise, may determine a second energy value associated with a signal, and may determine a SNR feature by dividing the second energy value by the first energy value. However, the disclosure is not limited thereto and the SNR estimator 50 may determine the SNR feature using subtraction or other modification of the energy values without departing from the disclosure. For example, the first energy value may be an absolute power value (e.g., dBm) and the SNR estimator 50 may determine the SNR feature by subtracting the first energy value from the second energy value.

Additionally or alternatively, the SNR features 52 may correspond to other comparisons between signal and noise without departing from the disclosure. In some examples, the model-free output 32 and/or the model-based output 42 may be confidence scores and the SNR estimator 50 may compare the confidence scores to generate additional information for the second stage presence detector 110. For example, a first confidence score may indicate a likelihood that a noise is associated with human speech (e.g., first output from a first model-based detector 40), while a second confidence score may indicate a likelihood that the noise is associated with an appliance (e.g., second output from a second model-based detector 40). Instead of generating a ratio between a signal and a noise, the SNR estimator 50 may subtract the second confidence score from the first confidence score and/or perform other comparisons. Thus, the SNR estimator 50 may compare different thresholds of human activity to non-human activity, providing the second stage presence detector 110 with additional information.

The system 100 may include a second stage presence detector 110 configured to receive the model-free output 32, the model-based output 42 and/or the SNR features 52 and generate a decision 912. In some examples, the second stage presence detector 110 may receive inputs having multiple different time scales to provide granular data with which the second stage presence detector 110 may determine whether human activity is detected. As discussed above, the SNR features 52 are not limited to a signal to noise ratio but may include additional comparisons between signals and noise, such as comparing confidence scores or the like. In some examples, the second stage presence detector 110 may update a background energy estimate, as discussed above with regard to FIG. 3.

The decision 912 may include binary data (e.g., logic low level and logic high level), confidence scores indicating a likelihood that human presence is detected and/or non-binary data (e.g., a range of values from 0 to 1) without departing from the disclosure. For example, a logic low level (e.g., 0) may correspond to human activity not detected (e.g., no human presence) while a logic high level (e.g., 1) may correspond to human activity being detected (e.g., human presence). Additionally or alternatively, the second stage presence detector 110 may generate additional information, such as start point(s) and/or end point(s) associated with the decision 912.

The second stage presence detector 110 may be a rule/state-based classifier. For example, a simple rule-based classifier may be an OR gate combination of the model-free output 32 and the model-based output 42. Thus, the second stage presence detector 110 may output a logic high level whenever the model-free output 32 or the model-based output 42 includes a logic high level. However, the disclosure is not limited thereto and the second stage presence detector 110 may include additional processing. For example, as more training and evaluation data for presence detection is made available, the second stage presence detector 110 may adopt a statistical classifier-based (e.g. SVM) scheme. In some examples, the second stage presence detector 110 may receive and/or determine start and endpoints of the individual detectors and time stamps of sub-events (e.g. beginning of a door opening and beginning of voice activity). In some examples, the second stage presence detector 110 may determine the decision 912 based on confidence scores or other non-binary data included in the model-free output 32 and/or the model-based output 42.

As illustrated in FIG. 1, the second stage presence detector 110 may receive (130) inputs from the model-based detector(s) 40, may receive (132) input from the model-free detector 30 and may determine (134) a confidence score that human presence is detected. For example, if the model-free output 32 is a logic high level, the second stage presence detector 110 may generate a first confidence score (e.g., 60%) that human presence is detected, whereas if the model-free output 32 is a logic high level and the model-based output 42 associated with a positive indicator is a logic high level, the second stage presence detector 110 may generate a second confidence score (e.g., 90%) that human presence is detected. In contrast, if the model-free output 32 is a logic high level and the model-based output 42 associated with a negative indicator is a logic high level, the second stage presence detector 110 may generate a third confidence score (e.g., 20%) that human presence is detected.

The second stage presence detector 110 may determine (136) that the confidence score exceeds a threshold (e.g., 50%) and may generate (138) output indicating that human presence is detected. The duration of time that the output indicates that human presence is detected may be determined based on the model-free output 32 and/or the model-based output 42. For example, the second stage presence detector 110 may receive and/or determine start and endpoints of the individual detectors and time stamps of sub-events and the duration of time may be determined based on the start and end-points and/or the time stamps of the sub-events.

Figure 4B:
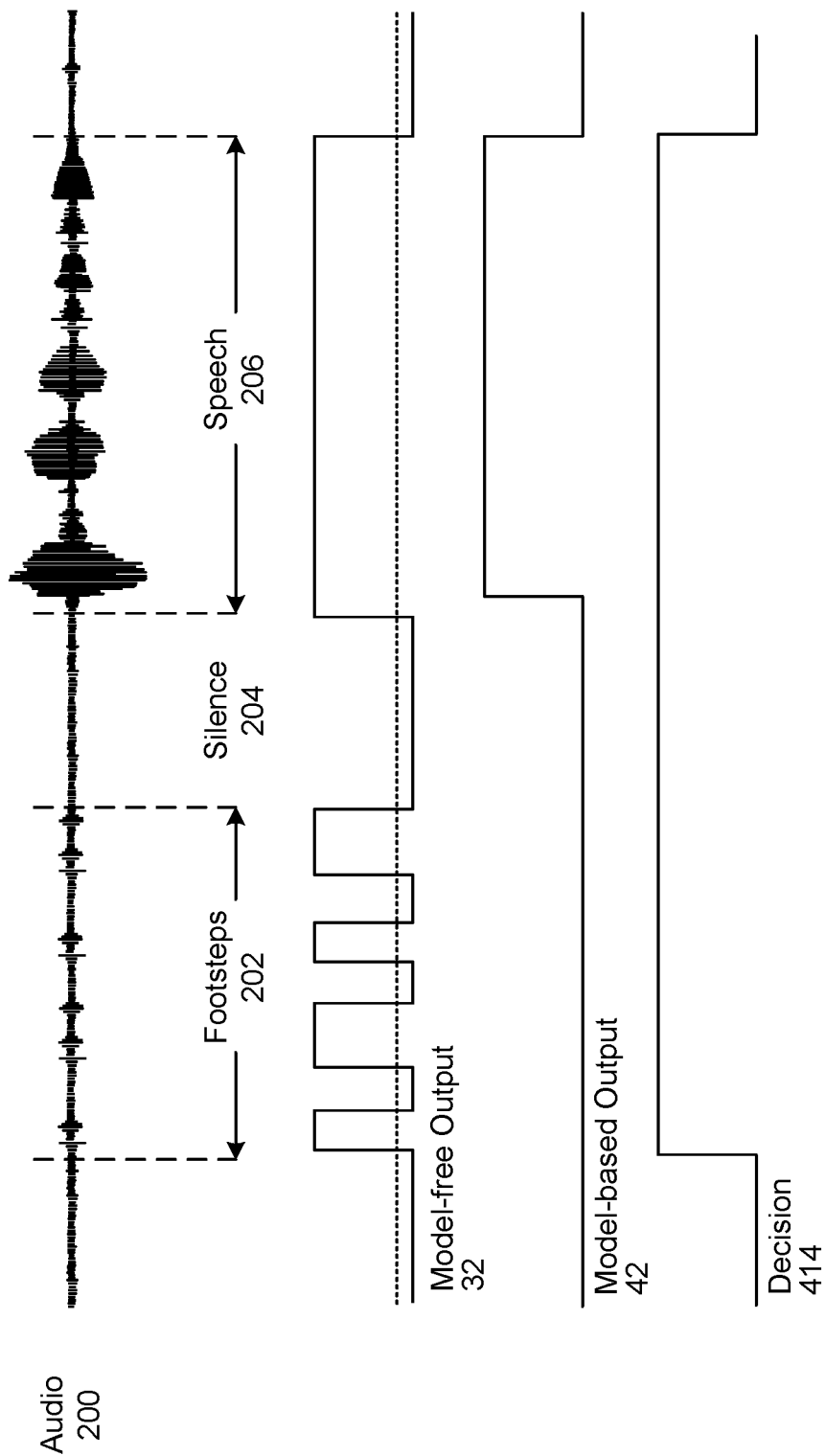

FIGS. 4A-4C illustrate examples of output from a hybrid detector according to examples of the present disclosure. As illustrated in FIG. 4A, the second stage presence detector 110 may receive the model-free output 32 and the model-based output 42 and may generate decision 412, which includes a logic high level whenever the model-free output 32 or the model-based output 42 includes a logic high level. For example, the second stage presence detector 110 may not perform additional processing or hysteresis to determine when human presence is first detected and maintain a logic high level until human presence is last detected.

As illustrated in FIG. 4B, the second stage presence detector 110 may generate decision 414 that includes a logic high level from when human presence is first detected (e.g., first logic high level included in the model-free output 32 corresponding to a beginning of the footsteps 202) and maintain a logic high level until human presence is last detected (e.g., logic low level in the model-free output 32 and the model-based output 42 after the speech 206).

As illustrated in FIG. 4C, the second stage presence detector 110 may generate decision 416 that avoids false-positives and includes a logic high level from when human presence is first detected by the model-based detector(s) 40 (e.g., logic high level included in the model-based output 42 corresponding to a beginning of the speech 206) and maintain a logic high level until human presence is last detected by the model-based detector(s) 40 (e.g., logic low level in the model-based output 42 after the speech 206). The second stage presence detector 110 may ignore the logic high levels included in the model-free output 32 corresponding to the footsteps 202 due to the logic high levels not extending for a sufficient duration of time, due to the model-based output 42 not confirming the model-free output 32, or due to other processing decisions performed by the second stage presence detector 110.

FIG. 5 illustrates an example of output from a hybrid detector including multiple model-based detectors according to examples of the present disclosure. As illustrated in FIG. 5, the second stage presence detector 110 may receive the model-free output 32 from the model-free detector 30, may receive first model-based output 42a from a first model-based detector 40a, may receive second model-based output 42b from a second model-based detector 40b, may receive third model-based output 42c from a first model-based detector 40c, and may receive fourth model-based output 42d from a fourth model-based detector 40d. For example, the first model-based detector 40a may be configured to detect music, the second model-based detector 40b may be configured to detect speech, the third model-based detector 40c may be configured to detect sounds associated with animals (e.g., pets) and the fourth model-based detector 40d may be configured to detect sounds associated with appliances within a residence.

Based on the model-free output 32 and the model-based output 42, the second stage presence detector 110 may generate decision 512 indicating that human presence is detected from when human presence is first detected (e.g., first logic high level included in the model-free output 32 corresponding to a beginning of the footsteps 202) until human presence is last detected (e.g., logic low level in the model-free output 32 and the second model-based output 42b after the speech 206). However, as discussed above with regard to FIGS. 4A-4C, the disclosure is not limited thereto and the second stage presence detector 110 may generate an output similar to the decision 412 or the decision 416 without departing from the disclosure.

While not illustrated in FIG. 5, each of the model-based outputs 42 may be triggered at different points in time and/or at the same time. For example, the first model-based output 42a may include a logic high level corresponding to the speech 206 as the speech 206 may originate from a television or other video content that includes a soundtrack. In some examples, the second stage presence detector 110 may be configured to identify speech originating from video content as a false positive and not determine that human activity is detected. For example, the second stage presence detector 110 may interpret a logic high level in the second model-based output 42b as a positive indicator for human activity while the first model-based output 42a is a logic low level, but may interpret a logic high level in the second model-based output 42b as a negative indicator for human activity while the first model-based output 42a is a logic high level. The second stage presence detector 110 may identify recorded speech that is not indicative of human activity using other techniques known to one of skill in the art without departing from the disclosure.

While FIG. 5 illustrates a single model-free detector 30 generating model-free output 32, the disclosure is not limited thereto. Instead, in some examples the system 100 may include multiple model-free detectors 30 to determine background energy estimates for multiple time scales and corresponding model-free outputs simultaneously without departing from the disclosure. For example, a first model-free detector may determine a first model-free output using a five minute time scale for the background energy estimate and a second model-free detector may determine a second model-free output using an hour time scale for the background energy estimate. Additionally or alternatively, the system 100 may include multiple model-free detectors 30 corresponding to different frequency bands. For example, a first model-free detector 30 may analyze energy within a first frequency band while a second model-free detector 30 may analyze energy within a second frequency band without departing from the disclosure.

While FIG. 5 illustrates an example of the system 100 generating the decision 512 using a relatively small time scale (e.g., seconds), the disclosure is not limited thereto. Instead, the system 100 may detect human activity over a longer time scale (e.g., minutes or hours) without departing from the disclosure. For example, the system 100 may detect a number of logic high levels in the model-free output 32 and/or the model-based outputs 42 over a period of time (e.g., five minutes) and may determine that human activity is detected. Additionally or alternatively, the system 100 may determine that human activity is detected but that the person is busy.

FIGS. 6A-6B illustrate examples of positive indicators and negative indicators according to examples of the present disclosure. As additional model-based detectors 40 are included in the device 120, the outputs can be combined selectively to determine whether human presence is detected. For example, some of the model-based detectors 40 may act as a positive indicator (e.g., positive trigger) for human presence, such as model-based detectors 40 configured to detect speech. Thus, a logic high level from the model-based detectors 40 may be associated with human presence and confirm a logic high level from the model-free detector 30.

FIG. 6A illustrates an example of a positive indicator. As illustrated in FIG. 6A, the model-based detector(s) 40 may be configured to detect speech and positive model-based output 642a includes a logic high level corresponding to the speech 206. As the model-free output 32 and the positive model-based output 642a include a logic high level corresponding to the speech 206, the decision 612 may include a logic high level corresponding to the speech 206, indicating that human activity is detected.

While FIG. 6A illustrates a binary output for the decision 612, the disclosure is not limited thereto. Instead, the decision 612 may range from a low level (e.g., 0) to a high level (e.g., 1) and/or the second stage presence detector 110 may output confidence scores associated with the decision 612. For example, a logic high level from the model-free detector 30 may be associated with a first confidence score, indicating a first likelihood that the human presence is detected. However, a logic high level from the model-based detectors 40 associated with positive indicators may be associated with a second confidence score higher than the first confidence score, indicating a second likelihood that the acoustic event is associated with human activity and therefore that human presence is detected.

In some examples, some of the model-based detectors 40 may act as a negative indicator (e.g., negative trigger) for human presence, such as model-based detectors 40 configured to detect music, noises associated with animals, street noises and/or noises associated with appliances. Outputs from model-based detectors 40 associated with negative indicators may be used to reduce the false-positives for acoustic events that are not of interest. For example, if a dog is barking or a cat is meowing, the model-free detector 30 may generate a logic high level despite the noise not being associated with human presence (e.g., false positive). However, a logic high level from the model-based detectors 40 may be associated with non-human activity and may cause the device 120 to ignore the logic high level from the model-free detector 30. For example, the model-free detector 30 may detect that the short-term audio level changed significantly over the long-term noise floor when a dog barks, generating a logic high level, but the model-based detector 40 configured to detect noises associated with animals may generate a logic high level, indicating that the noise detected by the model-free detector 30 was the result of non-human activity. Therefore, the device 120 may determine that human presence is not detected, despite the model-free detector 30 generating the logic high level.

FIG. 6B illustrates an example of a negative indicator. As illustrated in FIG. 6B, the audio 200 includes dog barking 606 instead of the speech 206. Thus, the model-based detector(s) 40 may be configured to detect animal sounds and negative model-based output 642b includes a logic high level corresponding to the dog barking 606. While the model-free output 32 includes a logic high level corresponding to the dog barking 606, indicating that a noise is detected, the negative model-based output 642b includes a logic high level indicating that the noise is associated with an animal sound. Therefore, the decision 622 may include a logic low level corresponding to the dog barking 606, indicating that human activity is not detected.

While FIG. 6B illustrates a binary output for the decision 622, the disclosure is not limited thereto. Instead, the decision 622 may range from a low level (e.g., 0) to a high level (e.g., 1) and/or the second stage presence detector 110 may output confidence scores associated with the decision 622. For example, a logic high level from the model-free detector 30 may be associated with the first confidence score discussed above, indicating the first likelihood that the human presence is detected. However, a logic high level from the model-based detectors 40 associated with negative indicators may be associated with a third confidence score lower than the first confidence score, indicating a third likelihood that the acoustic event is associated with human activity and therefore that human presence is detected. In this example, the third likelihood is low, indicating that the acoustic event is not associated with human activity and therefore that human presence is not detected.

Figure 7:
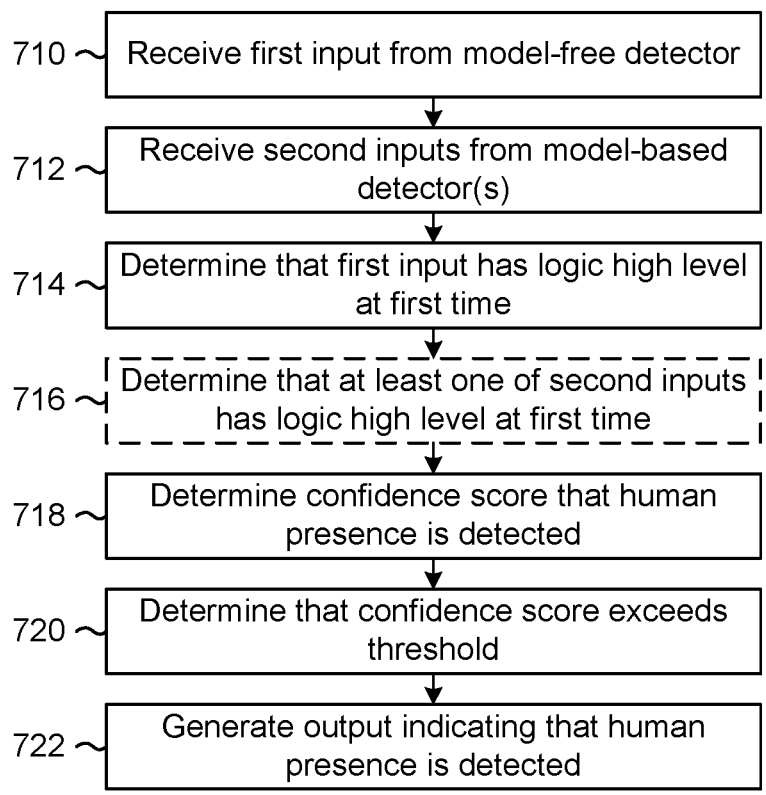
FIG. 7 is a flowchart conceptually illustrating an example method of generating output indicating that human presence is detected according to examples of the present disclosure.

FIG. 7 is a flowchart conceptually illustrating an example method of generating output indicating that human presence is detected according to examples of the present disclosure. As illustrated in FIG. 7, the system 100 may receive (710) first input from the model-free detector 30 and may receive (712) second inputs from the model-based detector(s) 40. The system 100 may determine (714) that the first input has a logic high level at a first time and may optionally determine (716) that at least one of the second inputs has a logic high level at the first time. As discussed above, the disclosure is not limited thereto and the first input and/or the second inputs may be in a range from a low level (e.g., 0) to a high level (e.g., 1) and/or may be associated with a confidence score indicating a likelihood that human presence is detected. For example, the model-free detector 30 may determine a first confidence score that human presence is detected and the model-based detector(s) 40 may determine second confidence scores that human presence is detected.

While optional step 716 illustrates an example of the system 100 requiring a logic high signal from at least one of the model-based detectors (e.g., positive indicators/triggers) in order to determine that human activity is detected, the disclosure is not limited thereto. Instead, the system 100 may determine that human activity is detected based only on the first input having a logic high level at the first time without departing from the disclosure. However, a confidence score may be lower when the first input has a logic high level but all of the second inputs have a logic low level.

The system 100 may determine (718) a confidence score that human activity and therefore human presence is detected. For example, the system 100 may determine the confidence score based on the first confidence score and the second confidence score, or based on the logic high level associated with one of the second inputs being a positive indicator of human activity. The system 100 may determine (720) that the confidence score exceed a threshold and may generate (722) output indicating that human presence is detected. As discussed above, the output may be a binary output (e.g., logic low level or logic high level), may be in a range from a low level (e.g., 0) to a high level (e.g., 1) and/or may be associated with a confidence score indicating a likelihood that human presence is detected.

Figure 8A:
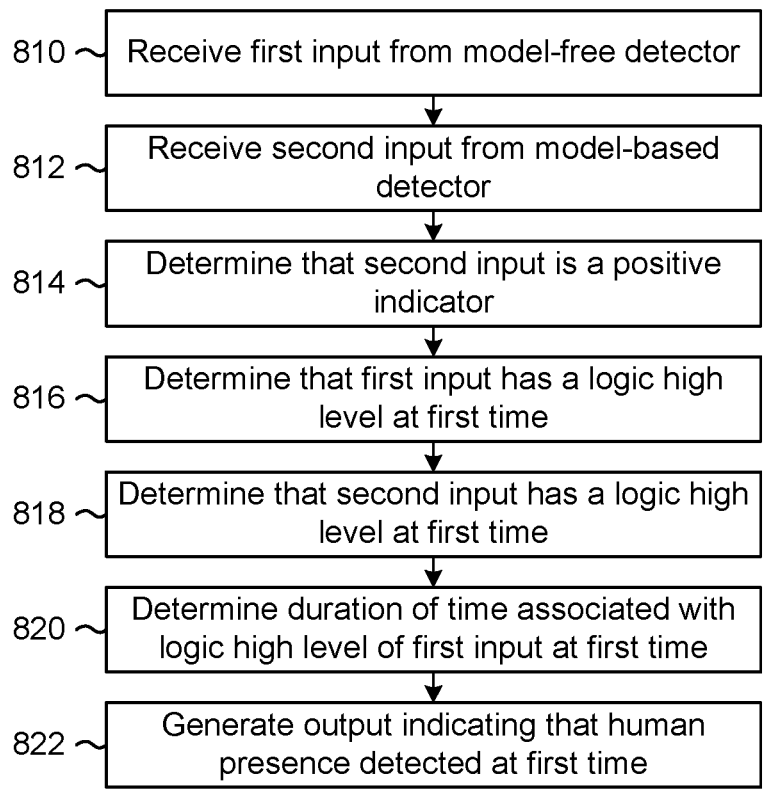
FIGS. 8A-8B are flowcharts conceptually illustrating example methods for generating output based on positive indicators and negative indicators according to examples of the present disclosure.
Figure 8B:
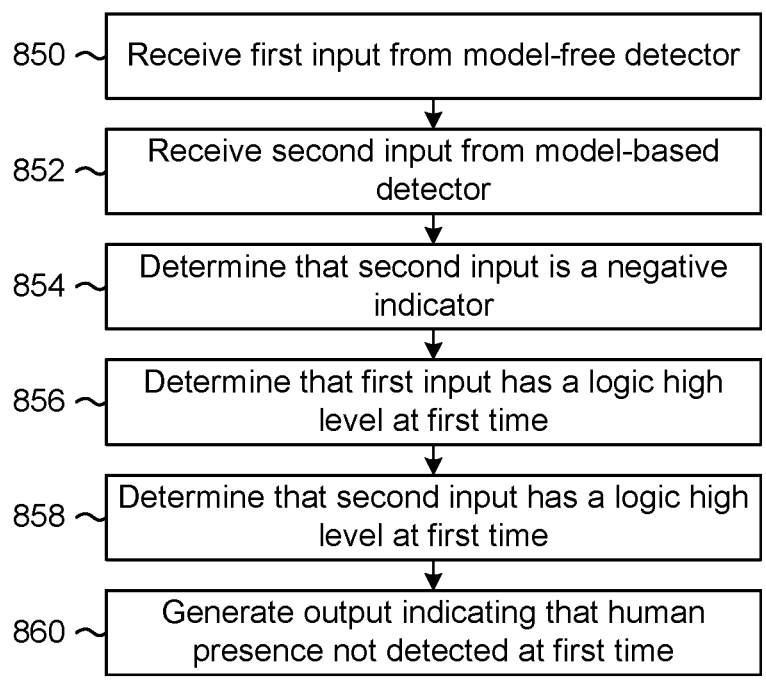

FIGS. 8A-8B are flowcharts conceptually illustrating example methods for generating output based on positive indicators and negative indicators according to examples of the present disclosure. As illustrated in FIG. 8A, the system 100 may receive (810) a first input from the model-free detector 30 and may receive (812) a second input from a model-based detector. The system 100 may determine (814) that the second input is a positive indicator (e.g., associated with human activity), such as output from a model-based detector 40 configured to detect speech.

The system 100 may determine (816) that the first input has a logic high level at a first time and may determine (818) that the second input has a logic high level at the first time. The system 100 may determine (820) a duration of time associated with the logic high level of the first input at the first time and may generate (822) an output indicating that human presence is detected at the first time for the duration of time, as illustrated by the decision 612 in FIG. 6A.

As illustrated in FIG. 8B, the system 100 may receive (850) a first input from the model-free detector 30 and may receive (852) a second input from a model-based detector. The system 100 may determine (854) that the second input is a negative indicator (e.g., associated with non-human activity), such as output from a model-based detector 40 configured to detect animal sounds, sounds associated with street noises outside of a residence, sounds associated with appliances within the residence, etc.

The system 100 may determine (856) that the first input has a logic high level at a first time and may determine (858) that the second input has a logic high level at the first time. The system 100 may generate (822) an output indicating that human presence is not detected at the first time, as illustrated by the decision 622 in FIG. 6B.

Figure 9:
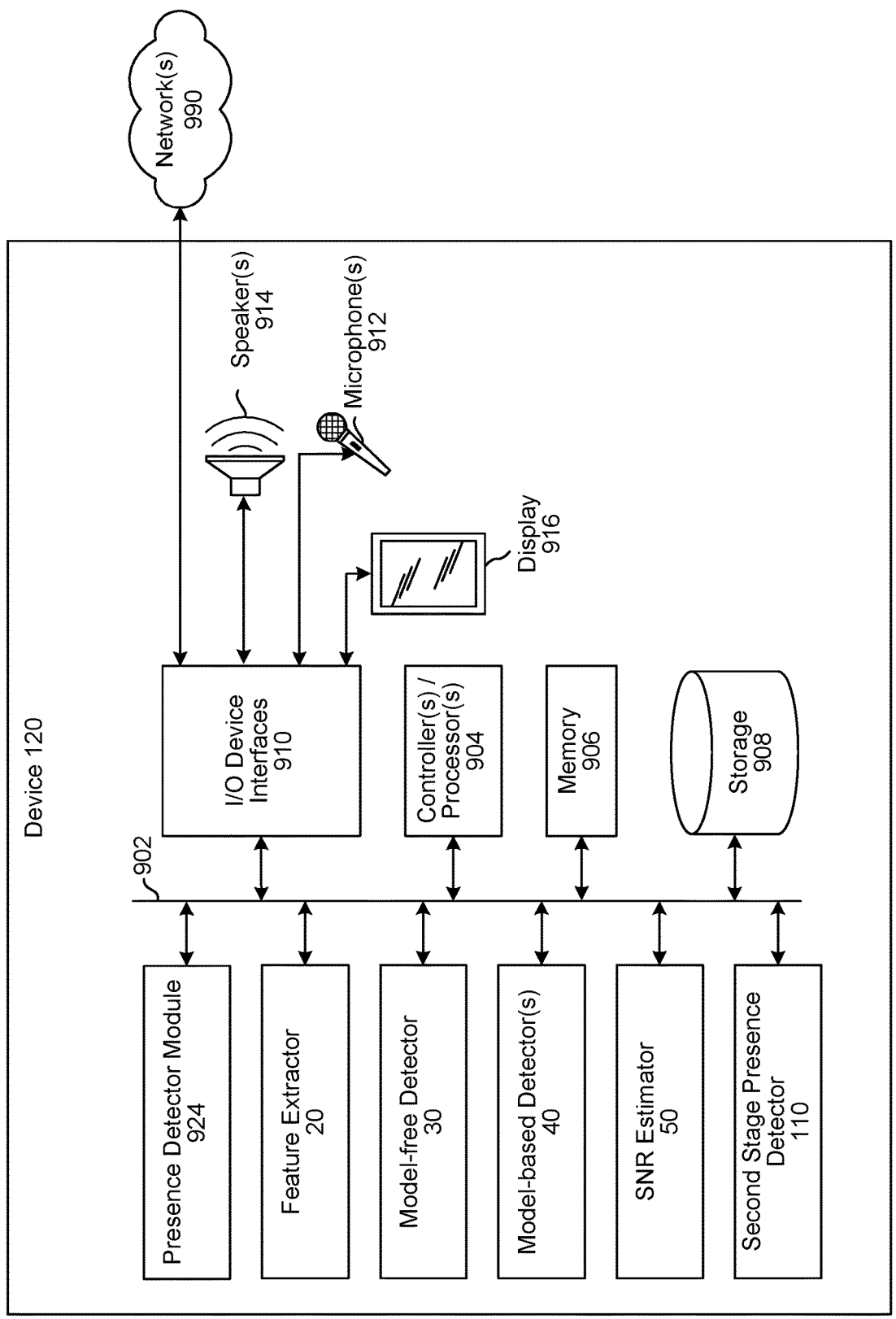
FIG. 9 is a block diagram conceptually illustrating example components of a system for human presence detection according to embodiments of the present disclosure.

FIG. 9 is a block diagram conceptually illustrating example components of a system for human presence detection according to embodiments of the present disclosure. In operation, the system 100 may include computer-readable and computer-executable instructions that reside on the device 120, as will be discussed further below. The device 120 may be an electronic device capable of capturing and/or receiving audio input and determining whether human presence is detected in the audio input. Examples of electronic devices may include computers (e.g., a desktop, a laptop, a server or the like), portable devices (e.g., a camera (such as a 360° video camera, a security camera, a mounted camera, a portable camera or the like), smart phone, tablet or the like), media devices (e.g., televisions, video game consoles or the like) or the like. The device 120 may also be a component of any of the abovementioned devices or systems.

As illustrated in FIG. 9, the device 120 may include an address/data bus 902 for conveying data among components of the device 120. Each component within the device 120 may also be directly connected to other components in addition to (or instead of) being connected to other components across the bus 902.

The device 120 may include one or more controllers/processors 904, that may each include a central processing unit (CPU) for processing data and computer-readable instructions, and a memory 906 for storing data and instructions. The memory 906 may include volatile random access memory (RAM), non-volatile read only memory (ROM), non-volatile magnetoresistive (MRAM) and/or other types of memory. The device 120 may also include a data storage component 908, for storing data and controller/processor-executable instructions (e.g., instructions to perform the algorithm illustrated in FIGS. 1, 7, 8A and/or 8B). The data storage component 908 may include one or more non-volatile storage types such as magnetic storage, optical storage, solid-state storage, etc. The device 120 may also be connected to removable or external non-volatile memory and/or storage (such as a removable memory card, memory key drive, networked storage, etc.) through the input/output device interfaces 910.

The device 120 includes input/output device interfaces 910. A variety of components may be connected through the input/output device interfaces 910, such as a microphone(s) 912, speakers 914, and/or a display 916 connected to the device 120. However, the disclosure is not limited thereto and the device 120 may not include integrated microphone(s) 912, speakers 914, and/or display 916. Thus, the microphone(s) 912, speakers 914, display 916 and/or other components may be integrated into the device 120 or may be separate from the device 120 without departing from the disclosure. In some examples, the device 120 may include an inertial measurement unit (IMU), gyroscope, accelerometers or other component configured to provide motion data or the like associated with the device 120. If an array of microphones 912 is included, approximate distance to a sound's point of origin may be performed acoustic localization based on time and amplitude differences between sounds captured by different microphones of the array.

The input/output device interfaces 910 may be configured to operate with network(s) 990, for example wired networks such as a wired local area network (LAN), and/or wireless networks such as a wireless local area network (WLAN) (such as WiFi), Bluetooth, ZigBee, a Long Term Evolution (LTE) network, WiMAX network, 3G network, etc. The network(s) 990 may include a local or private network or may include a wide network such as the internet. Devices may be connected to the network(s) 990 through either wired or wireless connections.

The input/output device interfaces 910 may also include an interface for an external peripheral device connection such as universal serial bus (USB), FireWire, Thunderbolt, Ethernet port or other connection protocol that may connect to network(s) 990. The input/output device interfaces 910 may also include a connection to an antenna (not shown) to connect one or more network(s) 990 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 120 may include a feature extractor 20, a model-free detector 30, model-based detector(s) 40, an SNR estimator 50 and/or a second stage presence detector 110, as described above with regard to FIGS. 1-8.

The device 120 further includes a presence detector module 924, which may comprise processor-executable instructions stored in storage 908 to be executed by controller(s)/processor(s) 904 (e.g., software, firmware, hardware, or some combination thereof). For example, components of the presence detector module 924 may be part of a software application running in the foreground and/or background on the device 120. The presence detector module 924 may control the device 120 as discussed above, for example with regard to FIGS. 1, 7, 8A and/or 8B. Some or all of the controllers/modules of the presence detector module 924 may be executable instructions that may be embedded in hardware or firmware in addition to, or instead of, software. In one embodiment, the device 120 may operate using an Android operating system (such as Android 4.3 Jelly Bean, Android 4.4 KitKat or the like), an Amazon operating system (such as FireOS or the like), or any other suitable operating system.

Executable computer instructions for operating the device 120 and its various components may be executed by the controller(s)/processor(s) 904, using the memory 906 as temporary "working" storage at runtime. The executable instructions may be stored in a non-transitory manner in non-volatile memory 906, storage 908, or an external device. Alternatively, some or all of the executable instructions may be embedded in hardware or firmware in addition to or instead of software.

The components of the device 120, as illustrated in FIG. 9, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for detecting human activity, the method comprising:
   capturing input audio data using a microphone located at a location;
   generating a first feature vector from the input audio data using a feature extractor;
   processing the first feature vector using an audio activity detector to determine that a first audio signal level corresponding to a first portion of the first feature vector exceeds a reference audio signal level by more than a threshold value, the first portion of the first feature vector representing first audio captured during a first period of time;
   generating, by the audio activity detector, first indicator data including a first logic high level indicating, for the first period of time, detected audio activity;
   determining, using a trained neural network that is separate from the audio activity detector, that a second portion of the first feature vector corresponds to speech, the trained neural network configured to distinguish between types of acoustic events, the second portion of the first feature vector representing second audio captured during a second period of time that includes at least a portion of the first period of time;
   generating, by the trained neural network, second indicator data including a second logic high level indicating, for the second period of time, that the second portion of the first feature vector corresponds to detected speech, the second indicator data corresponding to a first confidence score that indicates a first likelihood that a human is present;
   processing, using a trained model, the first indicator data generated by the audio activity detector and the second indicator data generated by the trained neural network to determine a second confidence score indicating a second likelihood that a human is present;
   determining, by the trained model, that a human is present at the location during a third period of time, the third period of time longer than the second period of time; and
   generating output data indicating presence of a human during the third period of time at the location.

2. The computer-implemented method of claim 1, further comprising:
   generating a second feature vector from the input audio data using the feature extractor;
   processing the second feature vector using the audio activity detector to determine that a second audio signal level corresponding to a first portion of the second feature vector exceeds the reference audio signal level by more than the threshold value, the first portion of the second feature vector representing third audio captured during a fourth period of time;
   generating, by the audio activity detector, third indicator data including a third logic high level indicating, for the fourth period of time, detected audio activity;
   determining, using the trained neural network, that a second portion of the second feature vector corresponds to an audible sound associated with an animal, the second portion of the second feature vector representing fourth audio captured during a fifth period of time that includes a portion of the fourth period of time;
   generating, by the trained neural network, fourth indicator data including a fourth logic high level indicating, for the fifth period of time, that the second portion of the second feature vector corresponds to the audible sound associated with the animal;
   processing, using the trained model, the third indicator data and the fourth indicator data to determine that human presence is not detected at the location during the fourth period of time; and
   generating second output data indicating that human presence is not detected during the fourth period of time at the location.

3. The computer-implemented method of claim 1, further comprising, by the audio activity detector:
   receiving the first feature vector;
   determining, using the first portion of the first feature vector, the first audio signal level;
   determining the reference audio signal level associated with the input audio data, wherein the reference audio signal level corresponds to an average signal value of the input audio data over a duration of time;
   determining a difference between the first audio signal level and the reference audio signal level;
   determining that the difference exceeds the threshold value; and
   generating the first indicator data, the first indicator data indicating that the first audio signal level of the first portion of the first feature vector exceeds the reference audio signal level by more than the threshold value during the first period of time.

4. A computer-implemented method, comprising:
   receiving, from at least one microphone associated with a device, an audio signal;
   receiving, from an audio change detector associated with the device, first indication data indicating that a first energy level associated with a first portion of the audio signal exceeds a threshold value, the first portion of the audio signal corresponding to a first period of time, the audio change detector configured to detect changes in a signal level of the audio signal;
   determining, using a first acoustic event detector of the device that is separate from the audio change detector, based on the first portion of the audio signal, second indication data indicating that the audio signal corresponds to a first type of acoustic event during the first period of time, the first acoustic event detector configured to distinguish between the first type of acoustic event and other types of acoustic events, the second indication data corresponding to a first confidence score that indicates a first likelihood that a human is present;
   determining, based on the first indication data received from the audio change detector and the second indication data determined by the acoustic event detector, a second confidence score indicating a second likelihood that a human is present during the first period of time;

determining that the second confidence score satisfies a condition; and in response to determining that the second confidence score satisfies the condition, generating output data indicating that a human is present during the first period of time.

5. The computer-implemented method of claim 4, further comprising:
receiving, from a second acoustic event detector, third indication data indicating that the audio signal does not correspond to a second type of acoustic event during the first period of time, the second type being different than the first type; and
determining, based on the first indication data, the second indication data, and the third indication data, that a human is present during the first period of time.

6. The computer-implemented method of claim 4, further comprising:
receiving, from the audio change detector, third indication data indicating that a second energy level associated with a second portion of the audio signal corresponding to a second period of time exceeds the threshold value;
determining, using a second acoustic event detector based on the second portion of the audio signal, fourth indication data indicating that the audio signal corresponds to a second type of acoustic event during the second period of time, the second acoustic event detector configured to distinguish between the second type of acoustic event and other types of acoustic events, the second type being different than the first type;
determining, based on the third indication data and the fourth indication data, that a human is not present during the second period of time; and
generating second output data indicating that a human is not present during the second period of time.

7. The computer-implemented method of claim 4, further comprising:
receiving a feature vector, the feature vector generated from the audio signal;
determining the first energy level using a first portion of the feature vector that corresponds to the first period of time;
determining a reference audio signal level associated with the audio signal;
determining a difference between the first energy level and the reference audio signal level;
determining that the difference exceeds a threshold value; and
generating the first indication data indicating that the first energy level associated with the first portion of the audio signal exceeds the threshold value during the first period of time.

8. The computer-implemented method of claim 4, further comprising:
determining, based on the first indication data and the second indication data, a first signal to noise ratio corresponding to a first time duration and associated with the audio change detector;
determining, based on the first indication data and the second indication data, a second signal to noise ratio corresponding to the first time duration and associated with the first acoustic event detector; and
determining, based on the first indication data, the second indication data, the first signal to noise ratio and the second signal to noise ratio, the second confidence score indicating the second likelihood that a human is present during the first period of time.

9. The computer-implemented method of claim 4, further comprising:
determining, based on the first indication data and the second indication data, a first signal to noise ratio corresponding to a first time duration;
determining, based on the first indication data and the second indication data, a second signal to noise ratio corresponding to a second time duration; and
determining, based on the first indication data, the second indication data, the first signal to noise ratio and the second signal to noise ratio, the second confidence score indicating the second likelihood that a human is present during the first period of time.

10. The computer-implemented method of claim 4, wherein the first acoustic event detector includes a deep neural-network configured to detect speech, the deep neural-network trained using a corpus of training data including a large number of acoustic events associated with speech, the deep neural-network configured to improve performance over time in response to acoustic events not included in the training data.

11. The computer-implemented method of claim 4, wherein the audio change detector generates the first indication data at least partially simultaneously to the first acoustic event detector generating the second indication data.

12. The computer-implemented method of claim 4, further comprising:
in response to the output data indicating that a human is present during the first period of time, executing a computer executable command.

13. A device, comprising:
at least one processor;
memory including instructions operable to be executed by the at least one processor to cause the device to:
receive, from at least one microphone associated with the device, an audio signal;
receive, from an audio change detector associated with the device, first indication data indicating that a first energy level associated with a first portion of the audio signal exceeds a threshold value, the first portion of the audio signal corresponding to a first period of time, the audio change detector configured to detect changes in a signal level of the audio signal;
determine, using a first acoustic event detector of the device that is separate from the audio change detector, second indication data indicating that a second portion of the audio signal corresponds to a first type of acoustic event, the second portion of the audio signal corresponding to a second period of time that includes at least a portion of the first period of time, the first acoustic event detector configured to distinguish between the first type of acoustic event and other types of acoustic events, the second indication data corresponding to a first confidence score that indicates a first likelihood that a human is present;
determine, based on at least the second indication data, a second confidence score indicating a second likelihood that a human is present;
determine, based on the second confidence score, that a human is present during at least the second period of time;
determine, based on the first indication data received from the audio change detector and the second indication data determined by the first acoustic event detector, a third period of time in which human presence is detected, the third period of time being longer than the second period of time; and generate output data indicating that a human is present during the third period of time.

14. The device of claim 13, wherein the memory further comprises instructions that, when executed by the at least one processor, further cause the device to:

receive, from a second acoustic event detector, third indication data indicating that the audio signal does not correspond to a second type of acoustic event during the first period of time, the second type being different than the first type; and determine, based on the first indication data, the second indication data, and the third indication data, that a human is present during the first period of time.

15. The device of claim 13, wherein the memory further comprises instructions that, when executed by the at least one processor, further cause the device to:

receive, from the audio change detector, third indication data indicating that a second energy level associated with a second portion of the audio signal exceeds the threshold value, the second portion of the audio signal corresponding to a fourth period of time;

determine, using a second acoustic event detector based on the second portion of the audio signal, fourth indication data indicating that the audio signal corresponds to a second type of acoustic event during the fourth period of time, the second acoustic event detector configured to distinguish between the second type of acoustic event and other types of acoustic events, the second type being different than the first type;

determine, based on the third indication data and the fourth indication data, that a human is not present during the fourth period of time; and generate second output data indicating that a human is not present during the fourth period of time.

16. The device of claim 13, wherein the memory further comprises instructions that, when executed by the at least one processor, further cause the device to:

receive a feature vector, the feature vector generated from the audio signal;

determine the first energy level using a first portion of the feature vector that corresponds to the first period of time;

determine a reference audio signal level associated with the audio signal;

determine a difference between the first energy level and the reference audio signal level;

determine that the difference exceeds a threshold value; and generate the first indication data indicating that the first energy level associated with the first portion of the audio signal exceeds the threshold value during the first period of time.

17. The device of claim 13, wherein the memory further comprises instructions that, when executed by the at least one processor, further cause the device to:

determine that the second confidence score exceeds a confidence threshold value; and determine that a human is present during at least the second period of time.

18. The device of claim 13, wherein the memory further comprises instructions that, when executed by the at least one processor, further cause the device to:

determine, based on the first indication data and the second indication data, a first signal to noise ratio corresponding to a first time duration and associated with the audio change detector;

determine, based on the first indication data and the second indication data, a second signal to noise ratio corresponding to the first time duration and associated with the first acoustic event detector; and determine, based on the first indication data, the second indication data, the first signal to noise ratio and the second signal to noise ratio, that a human is present during at least the second period of time.

19. The device of claim 13, wherein the memory further comprises instructions that, when executed by the at least one processor, further cause the device to:

determine, based on the first indication data and the second indication data, a first signal to noise ratio corresponding to a first time duration;

determine, based on the first indication data and the second indication data, a second signal to noise ratio corresponding to a second time duration; and determine, based on the first indication data, the second indication data, the first signal to noise ratio and the second signal to noise ratio, that a human is present during at least the second period of time.

20. The device of claim 13, wherein the first acoustic event detector includes a deep neural-network configured to detect speech, the deep neural-network trained using a corpus of training data including a large number of acoustic events associated with speech, the deep neural-network configured to improve performance over time in response to acoustic events not included in the training data.

21. A computer-implemented method, comprising:

receiving, from at least one microphone associated with a device, an audio signal;

determining, using a first acoustic event detector of the device, first indication data indicating that the audio signal corresponds to a first type of acoustic event during a first period of time, the first acoustic event detector configured to distinguish between the first type of acoustic event and other types of acoustic events, the first indication data corresponding to a first confidence score indicating a first likelihood that a human is present;

receiving, from an audio change detector associated with the device that is separate from the first acoustic event detector, second indication data indicating that an energy level associated with the audio signal exceeds a threshold value during a second period of time, the second period of time being longer than the first period of time and including at least a portion of the first period of time, the audio change detector configured to detect changes in a signal level of the audio signal;

determining, based on the first indication data and the second indication data, a second confidence score indicating a second likelihood that a human is present during the second period of time; and generating, based on the second confidence score, output data indicating that a human is present during the second period of time.

* * * * *